US008906256B2

(12) United States Patent
Chou et al.

(10) Patent No.: US 8,906,256 B2
(45) Date of Patent: Dec. 9, 2014

(54) NANOMETAL DISPERSION AND METHOD FOR PREPARING THE SAME

(75) Inventors: Chih-Wei Chou, Taichung (TW);
Ko-Hsin Chang, Taichung (TW)

(73) Assignee: China Medical University, Taichung (TW)

( * ) Notice: Subject to any disclaimer, the term of this patent is extended or adjusted under 35 U.S.C. 154(b) by 870 days.

(21) Appl. No.: 12/954,190

(22) Filed: Nov. 24, 2010

(65) Prior Publication Data

US 2011/0278497 A1 Nov. 17, 2011

(30) Foreign Application Priority Data

May 11, 2010 (TW) ................................ 99114925 A

(51) Int. Cl.
| | | |
|---|---|---|
| *B01J 19/08* | (2006.01) | |
| *B01J 19/12* | (2006.01) | |
| *C09K 3/00* | (2006.01) | |
| *B82Y 30/00* | (2011.01) | |
| *H01B 1/22* | (2006.01) | |

(52) U.S. Cl.
CPC . *H01B 1/22* (2013.01); *B82Y 30/00* (2013.01); *Y10S 977/786* (2013.01); *Y10S 977/81* (2013.01); *Y10S 977/895* (2013.01)
USPC ............ 252/183.12; 252/183.13; 252/182.12; 977/786; 977/810; 977/895; 204/157.43; 204/157.44

(58) Field of Classification Search
None
See application file for complete search history.

(56) References Cited

U.S. PATENT DOCUMENTS

| 6,017,901 | A  | * | 1/2000  | Khan et al. ...................... 514/54 |
|-----------|----|---|---------|---------------------------------------|
| 7,202,230 | B2 |   | 4/2007  | Rivarossa et al.                      |
| 8,314,078 | B2 | * | 11/2012 | Mousa et al. ................... 514/56 |
| 2004/0038406 | A1 | * | 2/2004 | Unger et al. .................. 435/459 |
| 2007/0003603 | A1 |   | 1/2007 | Karandikar et al.                     |
| 2007/0098713 | A1 | * | 5/2007 | Unger et al. ............... 424/133.1 |
| 2010/0317617 | A1 | * | 12/2010 | Mousa et al. ................... 514/56 |
| 2011/0278497 | A1 | * | 11/2011 | Chou et al. .............. 252/182.12 |

FOREIGN PATENT DOCUMENTS

WO       2010/010122 A1    1/2010

OTHER PUBLICATIONS

Buffat, Ph. et al., "Size effect on the melting temperature of gold particles", Physical Review A, vol. 13, No. 6, Jun. 1976, pp. 2287-2298.
Hu, Jianqiang et al., "Gold Nanoparticles With Special Shapes: Controlled Synthesis, Surface-enhance Raman Scattering, and The Application in Biodetection", Sensors 2007, 7, pp. 3299-3311.
Gole, Anand et al., "Seed-Mediated Synthesis of gold Nanorods: Role of the Size and Nature of the Seed", Chem. Mater 2004, 16, pp. 3633-3640.

* cited by examiner

*Primary Examiner* — Joseph D Anthony
(74) *Attorney, Agent, or Firm* — Ping Wang; Andrews Kurth LLP

(57) ABSTRACT

A nanometal dispersion and a method for preparing a nanometal dispersion are provided. The method comprises mixing a metal seed crystal aqueous solution, a polysaccharide aqueous solution, and a metal compound aqueous solution, followed by allowing the resulting mixture to conduct a reduction-oxidation reaction to form a nanometal. The produced nanometal dispersion comprises a polysaccharide and a nanometal. The polysaccharide is composed of N-actyl-D-glucosamine and glucuronic acid, and the nanometal has multi-morphology.

10 Claims, 18 Drawing Sheets
(18 of 18 Drawing Sheet(s) Filed in Color)

D11 (20 minutes)  D12 (40 minutes)  D14 (120 minutes)

NANOMETAL DISPERSION AND METHOD FOR PREPARING THE SAME

This application claims the benefit of Taiwan Patent Application No. 099114925, filed on May 11, 2010, in the Taiwan Intellectual Property Office, the disclosure of which is incorporated herein in its entirety by reference.

FIELD

The present invention relates to a nanometal dispersion and a method for preparing the dispersion. In particular, the present invention relates to a dispersion with good dispersibility and high biocompatibility, comprising a polysaccharide and a multimorphological nanometal.

BACKGROUND

It is well known that when the size of a bulk material reduces down to nano scale, its original physical properties such as optical, electrical, magnetical, and mechanical properties would change dramatically. For example, the melting point of pure gold has a fixed value (about 1064° C.) but as the particle size reduces down to nano scale, there is no longer a fixed value. See Ph. Buffat and J. P. Borel et al., Size Effect of the Melting Temperature of Gold Particles, *Phys. Rev. A,* 1976, 13, 2287. According to the previous facts, it opens a field for nano material applications.

Nanometals have their applications in many fields. For example, many important catalysts are constituted by metals. Nano-scaled metals greatly enhance catalytical performance. For example, it is hard to apply a bulk of gold into a chemical reaction, but it can be used as an excellent catalyst for the oxidation of carbon monoxide at low temperature when its particle size is about 2 nm. In addition, the surface plasma resonance of nanometal demonstrates its unique and strong light absorption character, and it is affected by molecules adsorbed on the surface of the nanometal, and thus the nanometal can be used as a sensor. In medical engineering, nanometals can be used for the diagnosis, treatment, and prevention of diseases and in areas like drug delivery, medical detection, disease diagnosis, gene detection, etc. For example, molecules, like DNA or proteins, are attached onto nanometal particles and through the alternation of fluorescence, conductivity and magnetism, it would be used for the diagnosis and assistance of treatment. The high specific surface area of nanometal particles can enhance the sensitivity for the detection which would help detect the disease in early stages and therefore only damage cancer cells selectively. Among the variety of metals, gold has high biocompatibility and is particular being used in biolabeling and detection.

It is known that the property of a nanometal would change in accordance with its morphology and its application would also be affected by its morphology. For example, in medical engineering, it has been reported that as compared with gold nanospheres, gold nanoparticles with hexagon and boot shapes exhibit high-sensitivity surface-enhanced Raman scattering (SERS) and have been successfully applied to the detection of Avidin (an egg white protein). See Gold Nanoparticles with Special Shapes: Controlled Synthesis, Surface-enhanced Raman Scattering, and The Application in Biodetection, *Sensors,* 2007, 7, 3299-3311.

Currently, many methods for preparing a nanometal have been proposed, including laser ablation method, metal vapor synthesis, chemical reduction method, etc. In the laser ablation method, the high energy of laser is used to melt a metal, and through the low temperature environment provided by a solution and the stabilizing agent contained therein, the nanometal formed can be evenly dispersed in the solution. In metal vapor synthesis, the main principle is to atomize a metal into metal atom steam and then mix the metal atom steam with inert gas or organic steam. The steam is then condensed onto a clean surface at a low temperature, followed by a separation procedure to obtain a nanometal. In the chemical reduction method, the oxidized metal ion is reduced back into zero-charged metal by a reducing agent or an electrochemical system and the growth of a desired nanometal can be controlled with relevant operation conditions.

The chemical reduction method includes the commonly-used seed-mediated growth method. The principle of the seed-mediated growth method is based on using small-sized nanometals (usually in the range from a few nanometers into tens of nanometers) as a seed crystal and adding a reducing agent to allow the metal ion to be reduced and then grow to the desired size and morphological nanometal on the seed crystal. Seed-Mediated Synthesis of Gold Nanorods: Role of the Size and nature of the Seed (Anand Gole and Catherine J. Murphy et al., *Chem. Mater.,* 2004, 16, 3633-3640) discloses a method for preparing nanometals via seed-mediated synthesis. It is necessary for such method to additionally formulate a growth solution for synthesizing gold nanorods with a step by step reaction. However, this method is extremely time-consuming, costly and is extremely complicated in procedure. Also, only a single-morphological nanometal would be obtained, and therefore, it is hard to promote such a method due to its low applicability.

Based on the above needs, this invention provides a simple preparation method that could obtain a multimorphological nanometal-containing nanometal dispersion with good dispersibility on a larger scale.

SUMMARY

One objective of this invention is to provide a method for preparing a nanometal dispersion which comprises a metal seed crystal aqueous solution, a polysaccharide aqueous solution, and a metal compound aqueous solution to obtain a mixture, wherein the polysaccharide aqueous solution comprises a polysaccharide composed of N-acetyl-D-glucosamine and glucuronic acid; and allowing the mixture to conduct reduction-oxidation reaction to form a nanometal therein.

Another objective of this invention is to provide a nanometal dispersion comprising a polysaccharide and a nanometal, wherein the polysaccharide is composed of N-acetyl-D-glucosamine and glucuronic acid.

The detailed technology and preferred embodiments are described in detail in the following paragraphs accompanying the appended drawings for people skilled in this field to well appreciate the purposes, technical features and advantages of the claimed invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DESCRIPTION OF THE PREFERRED EMBODIMENT

Figure 1A:
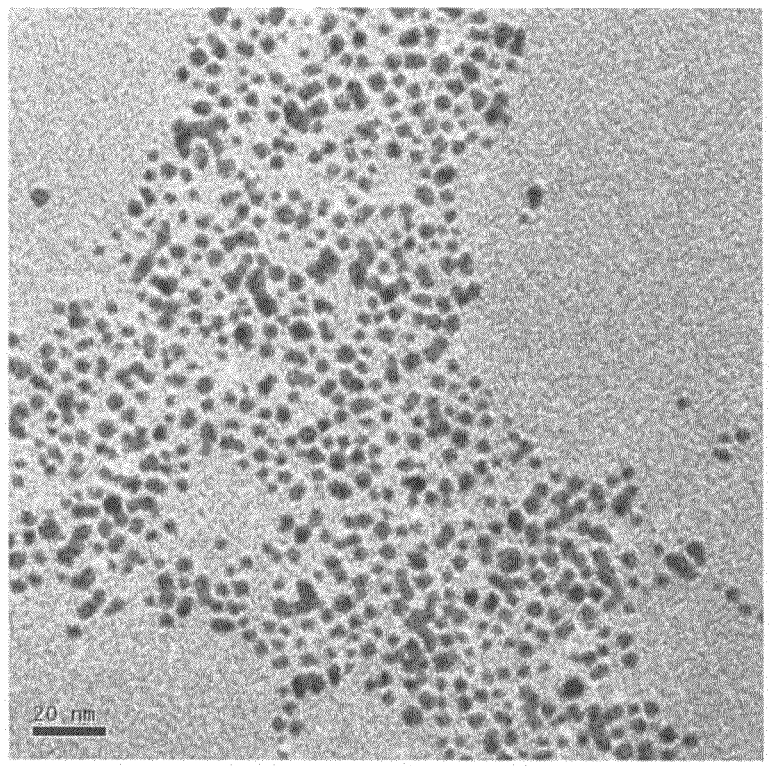
FIG. 1A shows the TEM image of exemplified seed crystal aqueous solution A1.

The present invention will be further illustrated in details with some embodiments as follows. However, the present invention can be embodied in other embodiments without departing from the spirit of the invention and should not be limited to the embodiments described in the specification.

In the method for preparing a nanometal dispersion according to the present invention, a metal seed crystal aqueous solution, a polysaccharide aqueous solution and a metal compound aqueous solution are first mixed to obtain a mixture of aqueous solutions. Usually, ultrapure water or deionized water is used as a solvent to provide the aforesaid aqueous solutions.

The metal seed crystal aqueous solution suitable for the present invention comprises a metal seed crystal for use as a nucleating site for a metal to grow to the desired size. In general, it is the seed crystal of a transition metal or noble metal, for example, selected from a group consisting of gold, silver, palladium, rhodium, ruthenium, osmium, iridium, and combinations thereof, and preferably, selected from a group consisting of gold, silver, and a combination thereof. The particle size of the metal seed crystal is generally less than about 35 nm, usually ranging from about 3 nm to about 30 nm, and preferably ranging from about 5 nm to about 15 nm.

The metal seed crystal aqueous solution can be prepared by any suitable methods. For example, a gold seed crystal aqueous solution can be obtained with the following steps: formulating an aqueous solution using chloroauric acid ($HAuCl_4$) in a proper amount and ultrapure water or deionized water, and then adding a reducing agent like sodium citrate ($C_6H_5Na_3O_7 \cdot 2H_2O$) or sodium borohydride ($NaBH_4$) to the aqueous solution to reduce sodium citrate therein to gold.

In the method of the present invention, the metal compound aqueous solution is used as the source for synthesizing a nanometal. If the concentration of the metal compound aqueous solution is too low, it would be difficult to form a nanometal with the desired particle size and morphology and the yield would be low. On the contrary, if the concentration is too high, the metal aggregation would easily occur and result in high costs. Therefore, in the method of the present invention, the concentration of the metal compound in the metal compound aqueous solution is generally controlled to a range from about 0.05 mM to about 20 mM, and preferably to a range from about 1 mM to about 12.5 mM. Optionally, one or more metal compounds can be used in the method of the present invention, such as a transition metal-containing compound and/or a noble metal-containing compound. The metal compound can be selected from a group consisting of chloroauric acid ($HAuCl_4$), bromoauric acid ($HAuBr_4$), silver nitrate ($AgNO_3$), palladium chloride ($PdCl_2$), copper chloride ($CuCl_2$), copper sulfate ($CuSO_4$), platinum chloride ($PtCl_2$), tin chloride ($SnCl_2$), rhodium chloride ($RhCl_2$), nickel chloride ($NiCl_2$), and combinations thereof. In one embodiment of the present invention, chloroauric acid or silver nitrate is used.

As indicated above, in the method of the present invention, the metal seed crystal in the metal seed crystal aqueous solution is acting as a nucleating site where a metal reduced from the metal compound in the metal compound aqueous solution grows to the desired particle size and morphology. Without being bound by theory, it is believed that the species of the metal used as the seed crystal and the species of the metal contained in the metal compound can be selected independently; in other words, they can be similar with or different from each other. For example, in the case of using a gold seed crystal aqueous solution, it can be mixed with a gold-containing compound aqueous solution to prepare nanogold, i.e., a nanometal that is entirely comprised of gold; or it can be mixed with a palladium-containing compound aqueous solution to prepare nanopalladium, i.e., a nanometal that is comprised of gold coated with palladium. Additionally, it can be mixed with an aqueous solution of gold-containing compound and palladium-containing compound to obtain a nano-sized gold-palladium alloy, i.e., a nanometal that is comprised of gold coated with a gold-palladium alloy. Other nanometals such as nanosilver, nanorhodium, nano-sized silver-rhodium alloy can be prepared with similar methods depending on the desired nanometal species and its applications.

In addition, in the method of the present invention, only a relatively small amount of the metal seed crystal is required to produce a desirable amount of the nanometal. Under certain operation conditions, when more metal seed crystal is added, the size of the nanometal obtained tends to decrease, and therefore, the size of the nanometal obtained can be controlled by adding some of the metal seed crystal. In general, the molar ratio of the metal seed crystal aqueous solution (calculated as the seed) to the metal compound aqueous solution (calculated as the metal) ranges from about $2\times10^{-5}$ to about $1.81\times10^{-1}$, preferably from about $4.53\times10^{-5}$ to about $1.81\times10^{-1}$. Basically, if the addition of the metal seed crystal is too little, it would be difficult to form a multimorphological nanometal and the yield would be too low; on the other hand, if the addition of the metal seed crystal is too high, the metal aggregates and an adverse effect to the formation of a nanometal would occur.

In the method of the present invention, the polysaccharide in the polysaccharide aqueous solution is used as an oxidizing agent for providing a reducing site to reduce the metal compound back to a metal, so that the metal can grow on the metal seed crystal (being the nucleating site) continually to the desired size and morphology. Only a small amount of the polysaccharide is required to conduct a reduction-oxidation reaction. If an excessive amount of polysaccharide is used, it would not improve the yield of the nanometal and would easily lead to solubility difficulty and high costs. The polysaccharide aqueous solution used in the present invention comprises a polysaccharide composed of N-acetyl-D-glucosamine and glucuronic acid. An example of the polysaccharide is hyaluronic acid. Without being bound by theory, it is believed that hyaluronic acid has good water absorption and could completely unfold itself in water; therefore, it could effectively prevent the metal seed crystal, growing metal particulate and formed nanometal from aggregating, which is advantageous to the nanometal synthesis, and the obtained nanometal dispersion would have good dispersibility and can be easily restored and applied. Furthermore, hyaluronic acid is an important moisturizing agent in the human body and has excellent biocompatibility and high degradability as compared with many other reducing agents commonly used in the preparation of a nanometal such as citric acid and sodium borohydride. By using hyaluronic acid, the applicability of the nanometal dispersion especially in the field of medical engineering can be greatly enhanced. As explained below, the preparation method using hyaluronic acid according to the present invention would simplify the operation procedure to obtain a nanometal and improve its yield.

In the method of the present invention, via adjusting the amount ratio of the polysaccharide to the metal compound, the morphology of the nanometal can be controlled such as particle-like, line-like, short line-like, thick string-like, thin string-like, etc.), plate-like, (e.g., skate-like, polygon-like, etc.), sphere-like (e.g., sugar apple-like, flower-like, polyhedrol-like, etc.). In the method of the present invention, the molar ratio of the polysaccharide aqueous solution (calculated as the polysaccharide) to the metal compound aqueous solution (calculated as the metal) generally ranges from about 556 to about 7,000,000, and can also range from about 35,000 to about 437,500 or from about 218,750 to about 350,000. The ratio is adjusted substantially depending on the desired morphology of the nanometal. In the case of using gold seed crystal (particle size ranging from about 12 nm to about 20 nm) with hyaluronic acid to reduce chloroauric acid, when the molar ratio of hyaluronic acid to chloroauric acid (calculated as the gold) ranges from about 875 to about 113,750, a line-like nanogold can be obtained; when the molar ratio ranges from about 113,750 to about 245,000, a skate-like nanogold can be obtained; when the molar ratio ranges from about 245,000 to about 332,500, a polygon-like nanogold can be obtained; when the molar ratio ranges from about 332,500 to about 568,750, a sphere-like nanogold can be obtained and when the molar ratio is greater than about 568,750, a polyhedrol-like nanogold can be obtained. Also, in the case of using gold seed crystal (particle size ranging from about 4 nm to about 6 nm) with hyaluronic acid to reduce chloroauric acid, when the molar ratio of hyaluronic acid to chloroauric acid (calculated as the gold) ranges from about 875 to about 13,125, a particle-like nanogold can be obtained; when the molar ratio ranges from about 13,125 to about 87,500, a line-like nanogold can be obtained; when the molar ratio ranges from about 87,500 to about 245,000, a skate-like nanogold can be obtained; when the molar ratio ranges from about 245,000 to about 2,800,000, a sphere-like nanogold can be obtained and when the molar ratio is greater than about 2,800,000, a polygon-like nanogold can be obtained.

In principle, there is no particular order for mixing the metal seed crystal aqueous solution, the polysaccharide aqueous solution and the metal compound aqueous solution. In one embodiment of the present invention, the metal seed crystal aqueous solution is mixed with the polysaccharide aqueous solution, followed by mixing with the metal compound aqueous solution.

The resulting mixture of the aqueous solutions is subjected to a reduction-oxidation reaction to form a nanometal. According to the method of the present invention, the step of allowing the mixture to conduct a reduction-oxidation comprises providing energy to the mixture with heat, light radiation or ray radiation, for example, via at least one of the following manners: a water bath, an oil bath, a heating plate, a microwave reaction, an UV light radiation, and a γ-ray radiation.

When using heat to conduct a reduction-oxidation reaction, the heating temperature generally ranges from about 40° C. to about 150° C. and preferably from about 50° C. to about 95° C. The heating time ranges from about 0.5 minutes to about 180 minutes. If the heating temperature is too low, the reduction-oxidation reaction cannot be conducted effectively and cannot provide a multimorphological nanometal. On the contrary, if the heating temperature is too high, the structure of polysaccharide would be easily damaged and result in a negative impact. Within the temperature range described above, when the heating temperature increases, the size of the formed nanoparticle increases. For example, a sugar apple-like nanogold is obtained when mixing the gold seed crystal aqueous solution, the hyaluronic acid aqueous solution, and the chloroauric acid aqueous solution together and heating the mixture for 60 minutes at 75° C.; and a flower-like nanogold is obtained when the heating temperature is increased to 95° C. Similarly, as shown in the examples hereinafter, the morphology of the obtained nanometal can be controlled by the heating time. When the heating time is shorter, the nanogold obtained is mostly sugar apple-like, and as the heating time increases, it would gradually change to flower-like and eventually, polyhedrol-like.

When using light radiation, such as UV light, to conduct the reduction-oxidation reaction, a radiation power ranging from about 5 W to about 1500 W, and preferably ranging from about 10 W to about 1200 W is applied for about 0.5 minute to 15 minutes. If the radiation power is too low, the reduction-oxidation reaction cannot be conducted effectively and cannot provide a multi-morphological nanometal. On the contrary, if the radiation power is too high, the structure of the polysaccharide would be easily damaged and result in a negative impact. Similarly, the size and morphology of the nanometal can be controlled by regulating the radiation power and time.

It can be known from the above that the method of the present invention adds a small amount of the metal seed crystal as the nucleating site and the polysaccharide as the reducing site to synthesize a multimorphological nanometal via simple operations such as heat, light radiation or ray radiation, and it does not produce any adverse by-products. Furthermore, the polysaccharide, hyaluronic acid, has excellent water absorption and high biodegradability and biocompatibility, and therefore, it does not only provide the obtained nanometal dispersion with excellent dispersibility for easy restoration and application but can also enhance living organisms' acceptability.

The present invention also provides a nanometal dispersion, comprising a polysaccharide and a nanometal, and preferably, prepared by the method described beforehand. The polysaccharide is composed of N-acetyl-D-glucosamine and glucuronic acid. An example of the polysaccharide is hyaluronic acid. The nanometal can be a transition metal or noble metal, for example, selected from a group consisting of gold, silver, palladium, rhodium, ruthenium, osmium, iridium, and combinations thereof. It is preferred that the nanometal is selected from a group consisting of gold, silver and a combination thereof. The nanometal can be composed of one metal or more metals, wherein the latter may be a nanometal composed of gold coated with silver or gold coated with a gold-silver alloy. Moreover, in the dispersion of the present invention, the molar ratio of the polysaccharide to the nanometal usually ranges from about 556 to about 7,000,000 and can also range from about 35,000 to about 437,500 or from about 218,750 to about 350,000. As mentioned above, the molar ratio of the polysaccharide to the nanometal is related to the morphology of the nanometal in the nanometal dispersion.

The nanometal in the nanometal dispersion of the present invention has many morphologies, including particle-like, line-like (e.g., short line-like, thick string-like, thin string-like, etc.), plate-like, (e.g., skate-like, polygon-like, etc.), sphere-like (e.g., sugar apple-like, flower-like, polyhedrol-like, etc.). As described above, the property of the nanometal is related to its morphology. The nanometal in the dispersion of present invention has multi-morphology and thus exhibits high applicability. In addition, the polysaccharide in the nanometal dispersion of the present invention can prevent the nanometal from aggregating, and hence has excellent dispersibility and can be easily restored.

The present invention will be further illustrated in details with the following working examples.

EXAMPLE

Preparation of a Gold Seed Crystal Aqueous Solution

<Seed Crystal Aqueous Solution A1>

Sample flasks were rinsed first with aqua regia (hydrochloric acid:nitric acid=3:1) then with ultrapure water, and then dried and ready for use.

Ultrapure water (19.5 mL) was mixed with chloroauric acid aqueous solution (0.5 mL; 10 mM) in a sample flask. Sodium citrate (0.0014705 g) was further added to be mixed evenly and dissolved completely to obtain an aqueous solution in a concentration of $2.5 \times 10^{-4}$ M.

Sodium borohydride powder (0.007566 g) was added to a sample flask with water (the total volume of the aqueous solution was 20 mL) to be mixed evenly and dissolved completely to form a sodium borohydride aqueous solution. The sodium borohydride aqueous solution was chilled in an ice bath and ready for use.

Aqueous solution (6 mL) prepared in step (3) was gradually and continuously added into the sample flask of step (2), and the mixture was stirred vigorously for few minutes to obtain a pink orange aqueous solution.

Figure 1B:
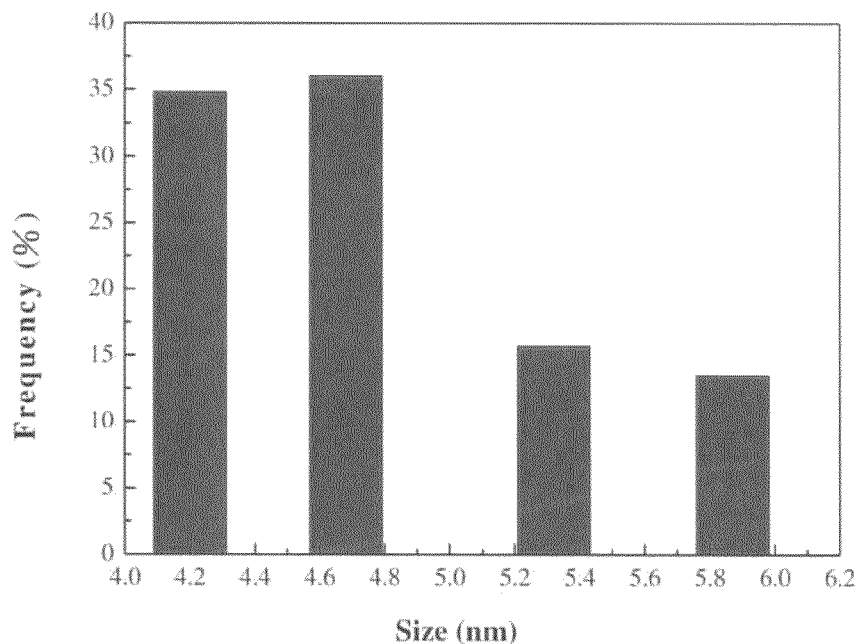
FIG. 1B shows the bar diagram of a particle size distribution in an exemplified seed crystal aqueous solution A1.

The size of particles in the aqueous solution was determined by a UV-vis-NIR spectrophotometer and its absorption wavelength ranged from 500 nm to 509 nm with an adjusted absorbance that ranged from 0.64 to 0.75. The seed crystal aqueous solution A1 (particle size ranging from about 4 nm to 6 nm), TEM image and particle size distribution diagram are shown in FIGS. 1A and 1B <Seed Crystal Aqueous Solution A2>

Sample flasks were rinsed first with aqua regia (hydrochloric acid:nitric acid=3:1) then with ultrapure water, and then dried and ready for use.

A chloroauric acid aqueous solution (1.5 mL; 100 mM) was added to boiling ultrapure water (198.5 mL) to obtain a chloroauric acid aqueous solution (200 mL; 1 mM).

Sodium citrate (0.0465 g) was dissolved in ultrapure water (3.5 mL) to prepare a sodium citrate aqueous solution in a concentration of 1.3 wt %.

The sodium citrate aqueous solution prepared in step (3) was added to the boiling chloroauric acid aqueous solution prepared in step (2). When the color appeared as wine-red, the heating was stopped. The solution was cooled to room temperature and filtered with a 0.22 micrometer filter screen, followed by centrifugation at 13,000 rpm to collect the precipitate which was re-dissolved in ultrapure water.

Figure 2A:
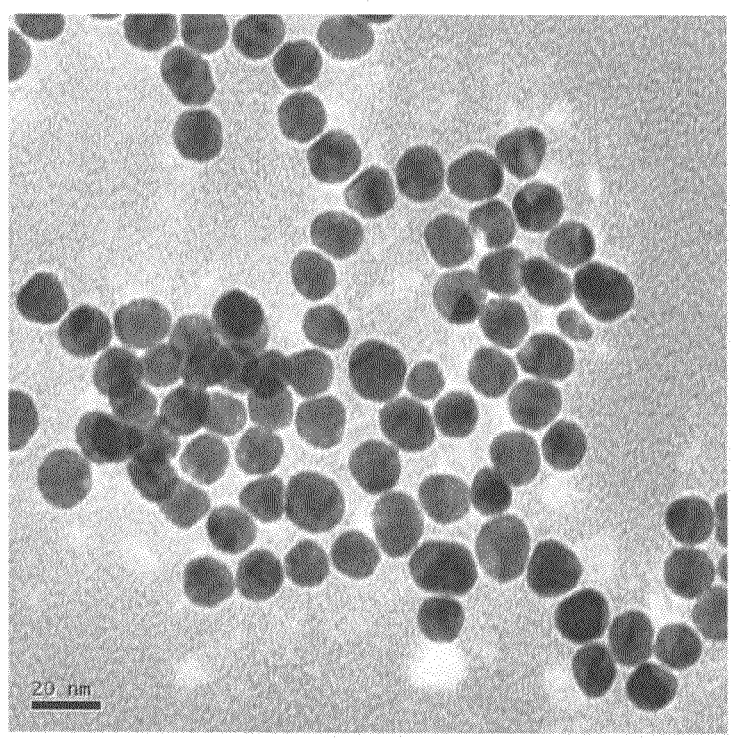
FIG. 2A shows the TEM image of an exemplified seed crystal aqueous solution A2.
Figure 2B:
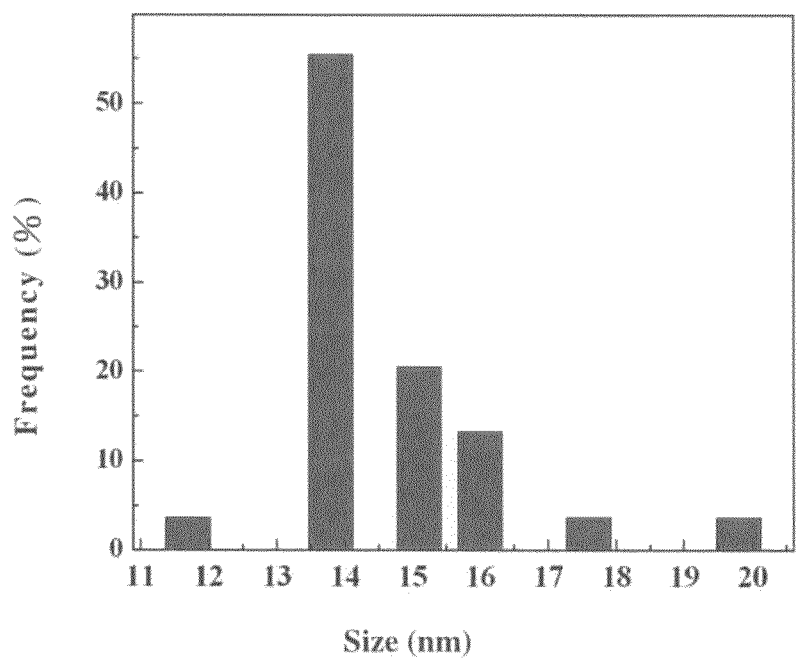
FIG. 2B shows the bar diagram of a particle size distribution in an exemplified seed crystal aqueous solution A2.

The size of particles in the aqueous solution was determined by a UV-vis-NIR spectrophotometer and the absorption wavelength ranged from 518 nm to 521 nm with an adjusted absorbance that ranged from 0.72 to 0.74. The seed crystal aqueous solution A2 (particle size ranging from about 12 nm to 20 nm), its TEM image, and particle size distribution diagram are shown in FIGS. 2A and 2B.

[Preparation Process for Nanometal Dispersion]

In the following examples, metal seed crystal aqueous solution A1 or A2 was firstly added to a hyaluronic acid aqueous solution and mixed evenly, and then the mixture was added to a chloroauric acid aqueous solution or silver nitrate aqueous solution, followed by heating the resulting mixture of aqueous solutions with a water bath or radiating it by UV light to allow a reduction-oxidation reaction to form a nanometal.

Example 1

The nanogold dispersions D1a, D1b, D1c, D1d, D1e, D1f and D1g, and D2a, D2b, D2c, D2d, D2e, D2f and D2g were prepared using the reacting components, amounts and conditions listed in Table 1 and according to the preparation process indicated above.

TABLE 1

| Nanogold Dispersion | Metal Seed Crystal Aqueous Solution | Hyaluronic Acid Aqueous Solution (20 mL) | Chloroauric Acid Aqueous Solution (10 mL) | Water Bath Heating Time (below 95° C.) |
|---|---|---|---|---|
| D1a-D1g | A1 0.12, 0.24, 0.48, 0.60, 0.72, 0.84, and 0.96 mL | 0.5 wt % | 7.5 mM | 60 minutes |
| D2a-D2g | A2 0.12, 0.24, 0.48, 0.60, 0.72, 0.84, and 0.96 mL | 0.5 wt % | 7.5 mM | 60 minutes |

Figure 3A:
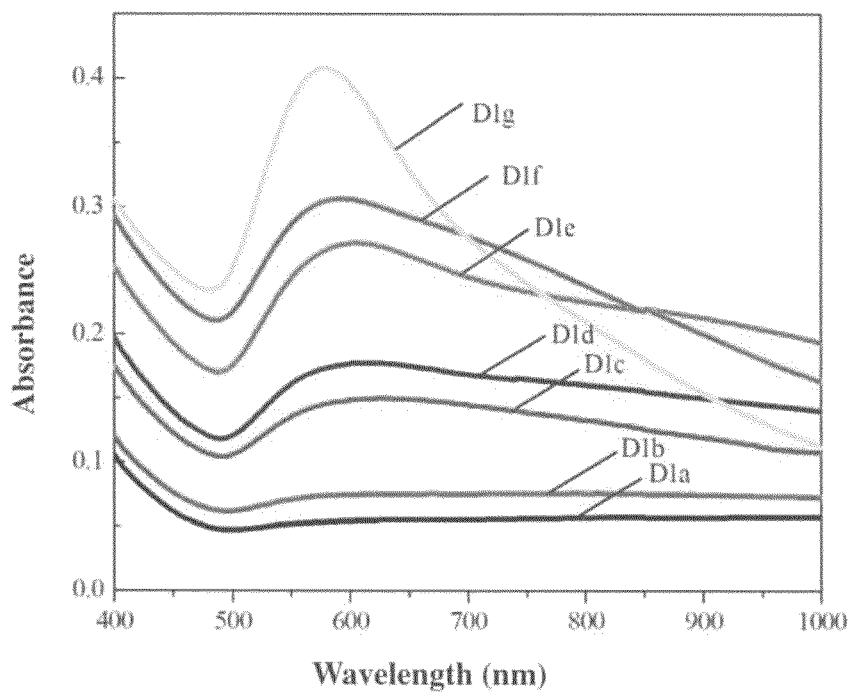
FIG. 3A shows the UV-vis-NIR absorption spectra of exemplified dispersions D1a to D1g.
Figure 3B:
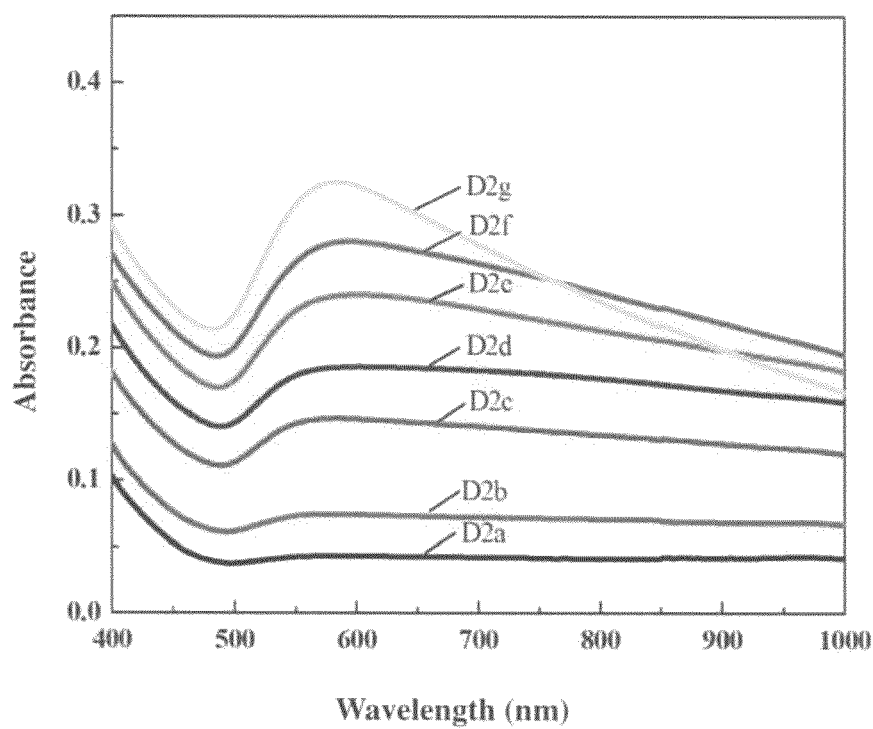
FIG. 3B shows the UV-vis-NIR absorption spectra of exemplified dispersions D2a to D2g.

The UV-vis-NIR absorption spectra of dispersions D1a to D1g are shown in FIG. 3A and the UV-vis-NIR absorption spectra of dispersion D2a to D2g are shown in FIG. 3B.

Example 2

Effects of Heating Temperature

The nanogold dispersions were prepared using the reacting components, amounts and conditions listed in Table 2 and Table 3 and according to the preparation process indicated above.

TABLE 2

| Nanogold Dispersion | Metal Seed Crystal Aqueous Solution | Hyaluronic Acid Aqueous Solution (20 mL) | Chloroauric Acid Aqueous Solution (10 mL) | Water Bath Heating Temperature (180 minutes) |
|---|---|---|---|---|
| D3 | A1/0.96 mL | 0.5 wt % | 7.5 mM | 55° C. |
| D4 | A1/0.96 mL | 0.5 wt % | 7.5 mM | 75° C. |
| D5 | A1/0.96 mL | 0.5 wt % | 7.5 mM | 95° C. |
| D6 | A2/0.96 mL | 0.5 wt % | 7.5 mM | 55° C. |
| D7 | A2/0.96 mL | 0.5 wt % | 7.5 mM | 75° C. |
| D8 | A2/0.96 mL | 0.5 wt % | 7.5 mM | 95° C. |

TABLE 3

| Nanogold Dispersion | Metal Seed Crystal Aqueous Solution | Hyaluronic Acid Aqueous Solution (20 mL) | Chloroauric Acid Aqueous Solution (10 mL) | Water Bath Heating Temperature (60 minutes) |
|---|---|---|---|---|
| D9 | A1/0.96 mL | 0.5 wt % | 7.5 mM | 75° C. |
| D10 | A1/0.96 mL | 0.5 wt % | 7.5 mM | 95° C. |

Figure 4A:
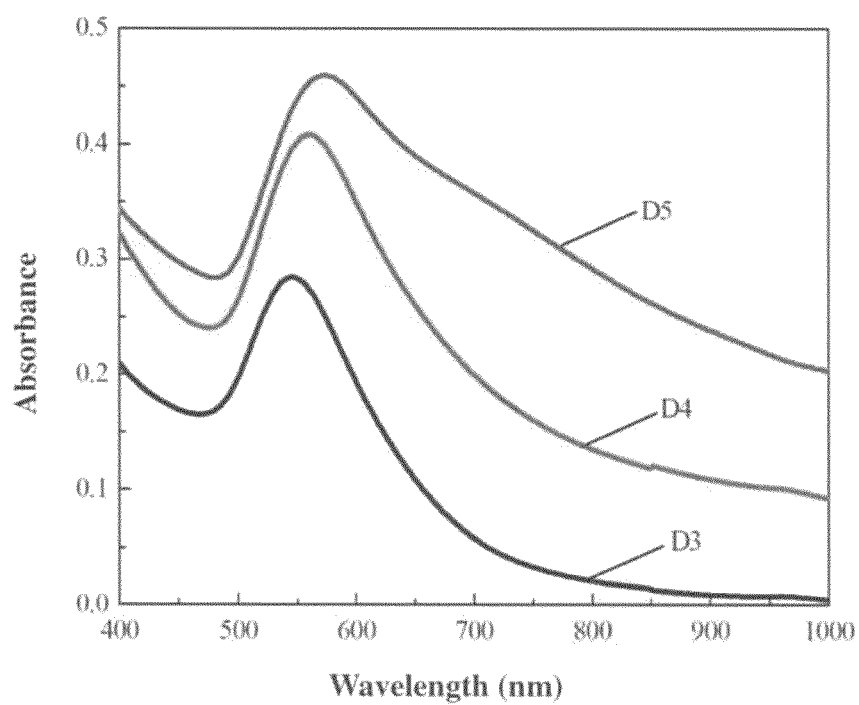
FIG. 4A shows the UV-vis-NIR absorption spectra of exemplified dispersions D3 to D5.
Figure 4B:
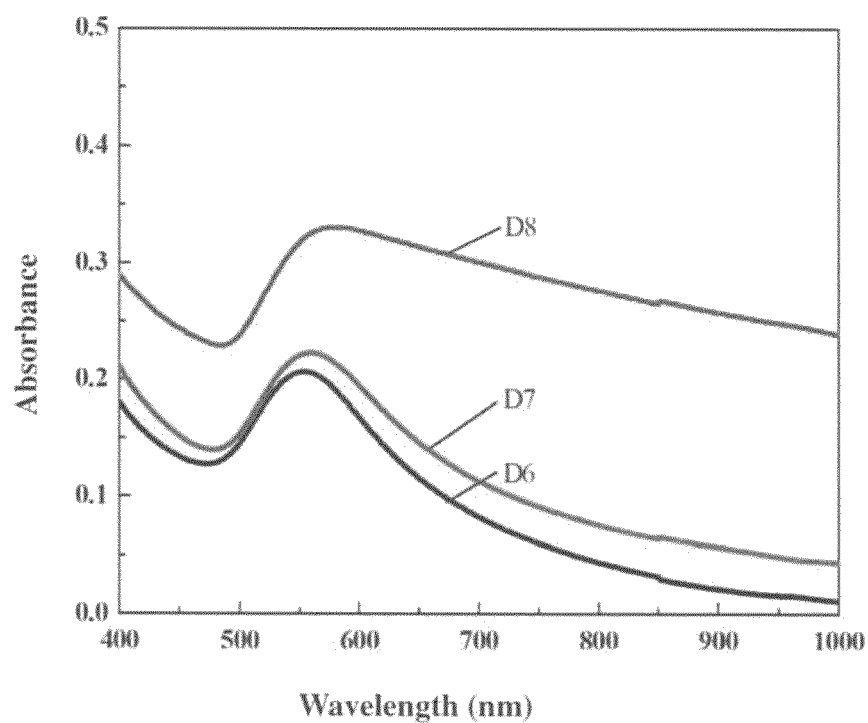
FIG. 4B shows the UV-vis-NIR absorption spectra of exemplified dispersions D6 to D8.
Figure 4C:
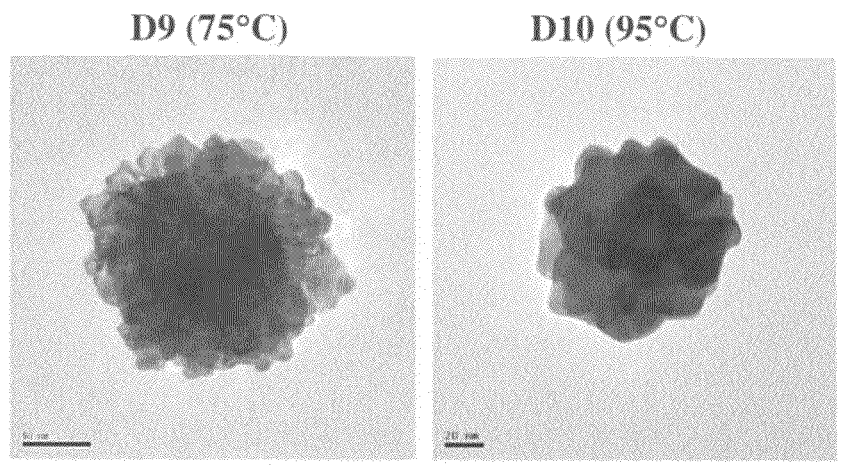
FIG. 4C shows the TEM images of exemplified dispersions D9 and D10.

FIGS. 4A and 4B show the UV-vis-NIR absorption spectra of dispersions D3, D4 and D5, and dispersions D6, D7 and D8, respectively. It can be found that when the heating temperature increases, the yield and size of the nanogold also increase. FIG. 4C illustrates the TEM images of dispersions D9 and D10, showing the multimorphology of the obtained nanogold. It can be found that a sugar apple-like nanogold is obtained when the heating temperature is below 75° C. and a flower-like nanogold is obtained when the heating temperature is increased to 95° C.

Example 3

Effects of Heating Time (1) Heating by Water Bath

The nanogold dispersions were prepared using the reacting components, amounts and conditions listed in Table 4 and according to the preparation process indicated above.

TABLE 4

| Nanogold Dispersion | Metal Seed Crystal Aqueous Solution | Hyaluronic Acid Aqueous Solution (20 mL) | Chloroauric Acid Aqueous Solution (10 mL) | Water Bath Heating Time (under 95° C.) |
|---|---|---|---|---|
| D11 | A1/0.96 mL | 0.5 wt % | 7.5 mM | 20 mins |
| D12 | A1/0.96 mL | 0.5 wt % | 7.5 mM | 40 mins |
| D13 | A1/0.96 mL | 0.5 wt % | 7.5 mM | 60 mins |
| D14 | A1/0.96 mL | 0.5 wt % | 7.5 mM | 120 mins |
| D15 | A1/0.96 mL | 0.5 wt % | 7.5 mM | 180 mins |
| D16 | A2/0.96 mL | 0.5 wt % | 7.5 mM | 20 mins |
| D17 | A2/0.96 mL | 0.5 wt % | 7.5 mM | 40 mins |
| D18 | A2/0.96 mL | 0.5 wt % | 7.5 mM | 60 mins |
| D19 | A2/0.96 mL | 0.5 wt % | 7.5 mM | 120 mins |
| D20 | A2/0.96 mL | 0.5 wt % | 7.5 mM | 180 mins |

Figure 5A:
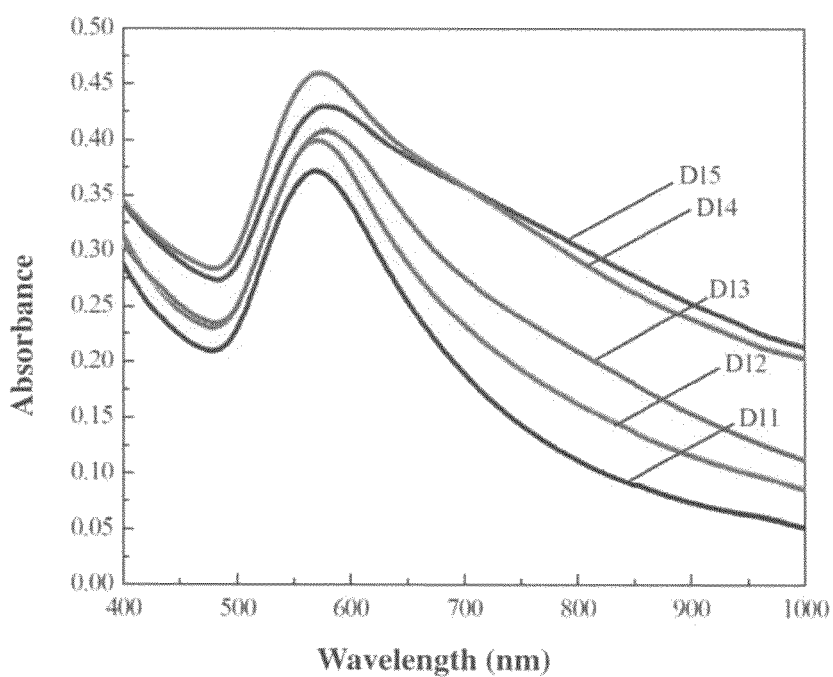
FIG. 5A shows the UV-vis-NIR absorption spectra of exemplified dispersions D11 to D15.
Figure 5B:
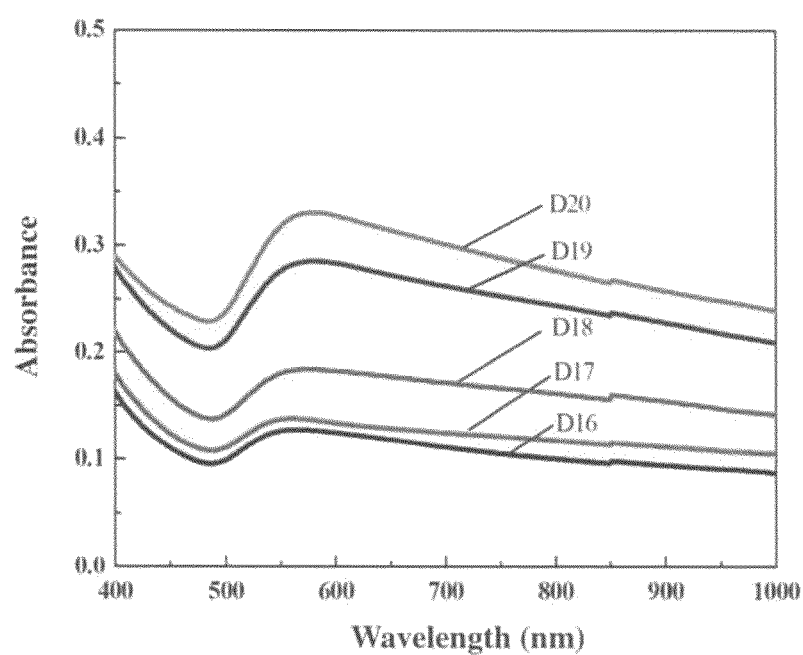
FIG. 5B shows the UV-vis-NIR absorption spectra of exemplified dispersions D16 to D20.
Figure 5C:
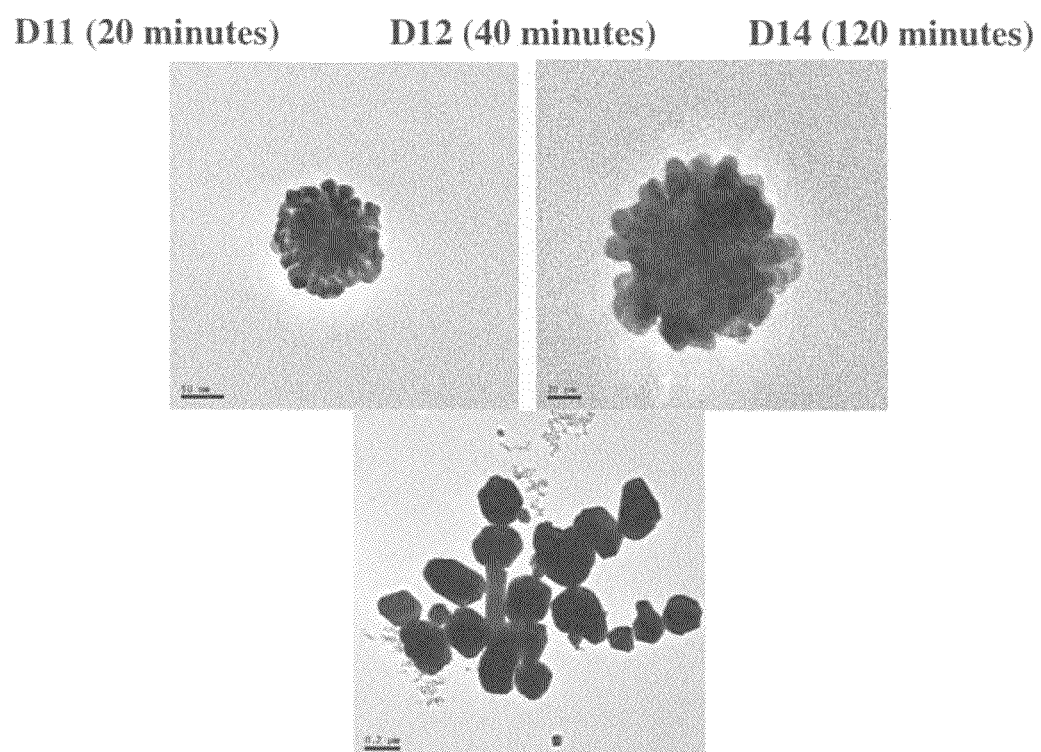
FIG. 5C shows the TEM images of exemplified dispersions D11, D12 and D14.

The UV-vis-NIR absorption spectra of dispersions D11 to D15 are shown in FIG. 5A and the UV-vis-NIR absorption spectra of dispersions D16 to D20 are shown in FIG. 5B. It can be found that when the heating time increases, the yield of the nanogold also increases. In FIG. 5C, the TEM images of dispersions D11, D12 and D14 show the multi-morphology of the obtained nanogold. The obtained nanogold shows a sugar apple-like shape when the heating time is about 20 minutes to 40 minutes and the obtained nanogold shows a polyhedrol-like shape when the heating time is increased to 120 minutes.

(2) UV Light Radiation

The nanogold dispersions were prepared using the reacting components, amounts and conditions listed in Table 5 and according to the preparation process indicated above.

TABLE 5

| Nanogold Dispersion | Metal Seed Crystal Aqueous Solution | Hyaluronic Acid Aqueous Solution (20 mL) | Chloroauric Acid Aqueous Solution (10 mL) | Radiation Time by UV light (Radiation Power: 1000 W) |
|---|---|---|---|---|
| D21 | A1/0.96 mL | 0.5 wt % | 7.5 mM | 1 min |
| D22 | A1/0.96 mL | 0.5 wt % | 7.5 mM | 2 mins |
| D23 | A1/0.96 mL | 0.5 wt % | 7.5 mM | 3 mins |
| D24 | A1/0.96 mL | 0.5 wt % | 7.5 mM | 4 mins |
| D25 | A1/0.96 mL | 0.5 wt % | 7.5 mM | 5 mins |
| D26 | A1/0.96 mL | 0.5 wt % | 7.5 mM | 6 mins |
| D27 | A1/0.96 mL | 0.5 wt % | 7.5 mM | 7 mins |
| D28 | A1/0.96 mL | 0.5 wt % | 7.5 mM | 8 mins |
| D29 | A2/0.96 mL | 0.5 wt % | 7.5 mM | 1 min |
| D30 | A2/0.96 mL | 0.5 wt % | 7.5 mM | 2 mins |
| D31 | A2/0.96 mL | 0.5 wt % | 7.5 mM | 3 mins |
| D32 | A2/0.96 mL | 0.5 wt % | 7.5 mM | 4 mins |
| D33 | A2/0.96 mL | 0.5 wt % | 7.5 mM | 5 mins |
| D34 | A2/0.96 mL | 0.5 wt % | 7.5 mM | 6 mins |
| D35 | A2/0.96 mL | 0.5 wt % | 7.5 mM | 7 mins |
| D36 | A2/0.96 mL | 0.5 wt % | 7.5 mM | 8 mins |

Figure 6A:
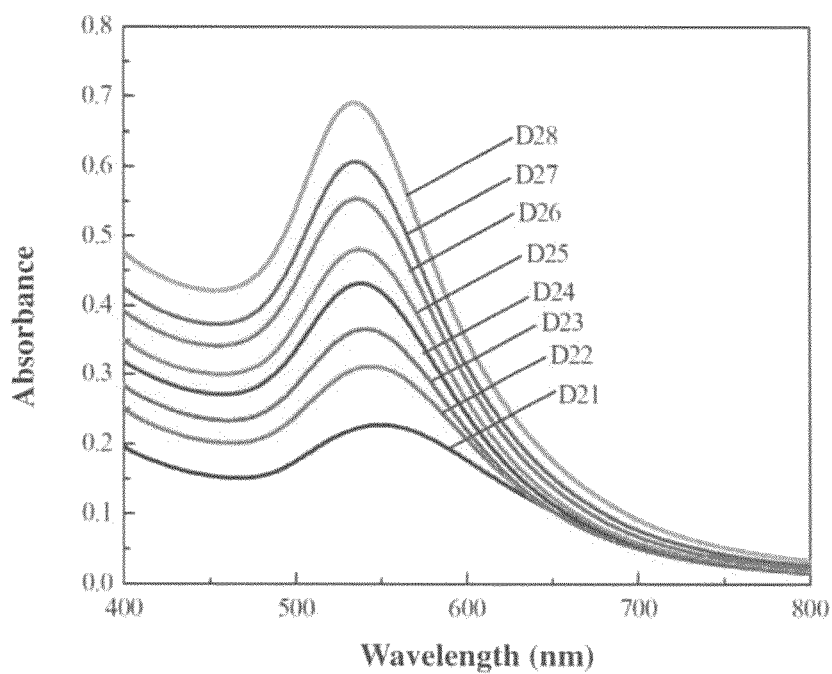
FIG. 6A shows the UV-vis-NIR absorption spectra of exemplified dispersions D21 to D28.
Figure 6B:
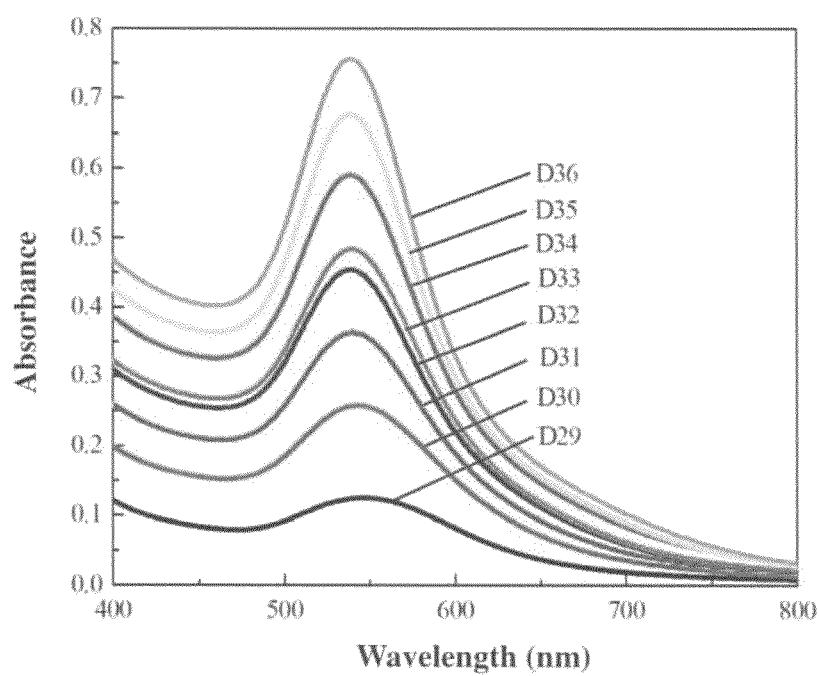
FIG. 6B shows the UV-vis-NIR absorption spectra of exemplified dispersions D29 to D36.

The UV-vis-NIR absorption spectra of dispersions D21 to D28 are shown in FIG. 6A whereas the UV-vis-NIR absoption spectra of dispersions D29 to D36 are shown in FIG. 6B. It can be found that when the radiation time increases, the yield of the nanogold also increases.

Example 4

Effects of Hyaluronic Acid Consumption

The nanogold dispersions were prepared using the reacting components, amounts and conditions listed in Table 6 and according to the preparation process indicated above.

TABLE 6

| Nanogold Dispersion | Metal Seed Crystal Aqueous Solution | Hyaluronic Acid Aqueous Solution (20 mL) | Chloroauric Acid Aqueous Solution (10 mL) | Water Bath Heating Time (under 95° C.) |
|---|---|---|---|---|
| D37 | A1/0.96 mL | 0.05 wt % | 7.5 mM | 60 mins |
| D38 | A1/0.96 mL | 0.3 wt % | 7.5 mM | 60 mins |
| D39 | A1/0.96 mL | 0.7 wt % | 7.5 mM | 60 mins |
| D40 | A2/0.96 mL | 0.05 wt % | 7.5 mM | 60 mins |
| D41 | A2/0.96 mL | 0.3 wt % | 7.5 mM | 60 mins |
| D42 | A2/0.96 mL | 0.7 wt % | 7.5 mM | 60 mins |

Figure 7A:
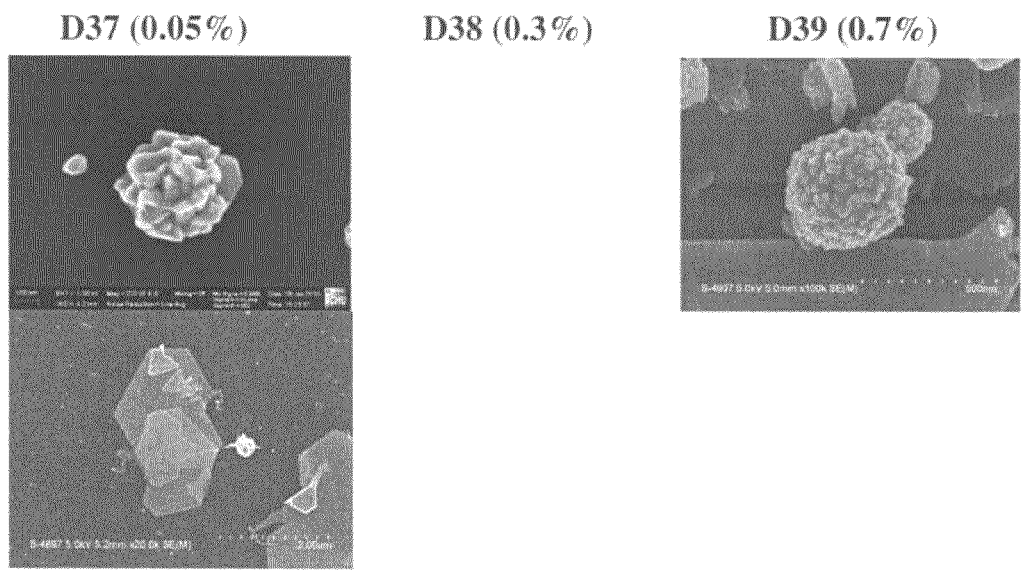
FIG. 7A shows the SEM images of exemplified dispersions D37, D38 and D39.

The SEM images of dispersions D37, D38 and D39 in FIG. 7A show that when the concentration of hyaluronic acid is lower (0.05 wt %), the obtained nanogold is flower-like, and as the concentration of hyaluronic acid increases, the nanogold becomes sugar apple-like, and when the concentration of hyaluronic acid is increased to 0.7 wt %, the nanogold is skate-like.

Figure 7B:
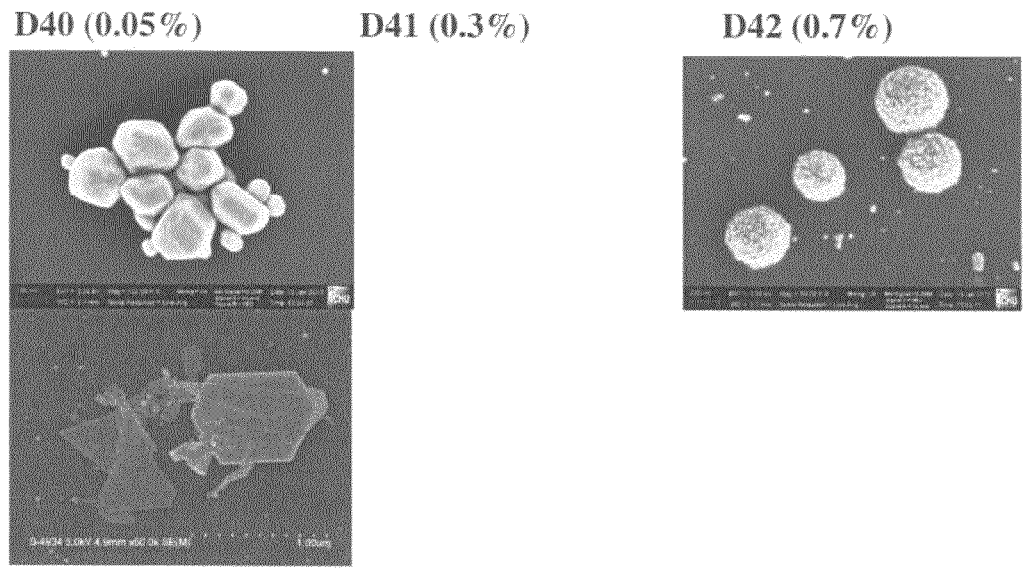
FIG. 7B shows the SEM images of exemplified dispersions D40, D41 and D42.

The SEM images of dispersions D40, D41, and D42 in FIG. 7B show that when the concentration of hyaluronic acid is lower (0.05 wt %), the obtained nanogold is polyhedrol-like, and as the concentration of hyaluronic acid increases, the nanogold becomes sugar apple-like, and when the concentration of hyaluronic acid is increased to 0.7 wt %, the nanogold is skate-like.

Example 5

Effects of Chloroauric Acid Consumption

The nanogold dispersions were prepared using the reacting components, amounts and conditions listed in Table 7 and according to the preparation process indicated above.

TABLE 7

| Nanogold Dispersion | Metal Seed Crystal Aqueous Solution | Hyaluronic Acid Aqueous Solution (20 mL) | Chloroauric Acid Aqueous Solution (10 mL) | Water Bath Heating Time (under 95° C.) |
|---|---|---|---|---|
| D43 | A1/0.96 mL | 0.5 wt % | 2.5 mM | 60 mins |
| D44 | A1/0.96 mL | 0.5 wt % | 4.25 mM | 60 mins |
| D45 | A1/0.96 mL | 0.5 wt % | 7.5 mM | 60 mins |
| D46 | A2/0.96 mL | 0.5 wt % | 2.5 mM | 60 mins |
| D47 | A2/0.96 mL | 0.5 wt % | 4.25 mM | 60 mins |
| D48 | A2/0.96 mL | 0.5 wt % | 7.5 mM | 60 mins |

Figure 8A:
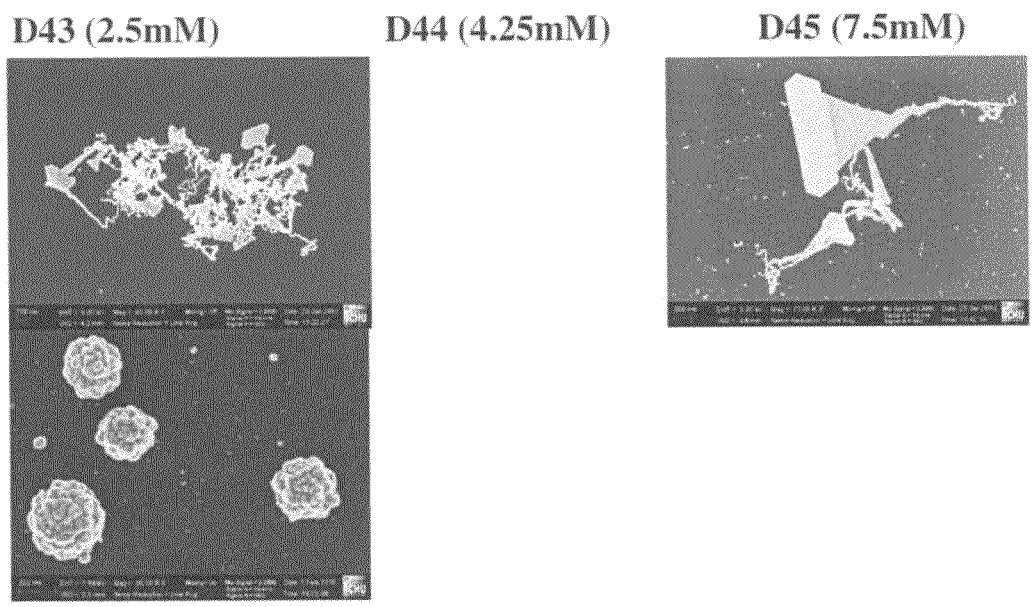
FIG. 8A shows the SEM images of exemplified dispersions D43, D44 and D45.

The SEM images of dispersions D43, D44 and D45 in FIG. 8A show that when the concentration of chloroauric acid is lower (2.5 mM), the obtained nanogold is line-like and polyhedrol-like, and as the concentration of chloroauric acid increases, the nanogold becomes skate-like, and when the concentration of hyaluronic acid is increased to 7.5 mM, the nanogold is flower-like.

Figure 8B:
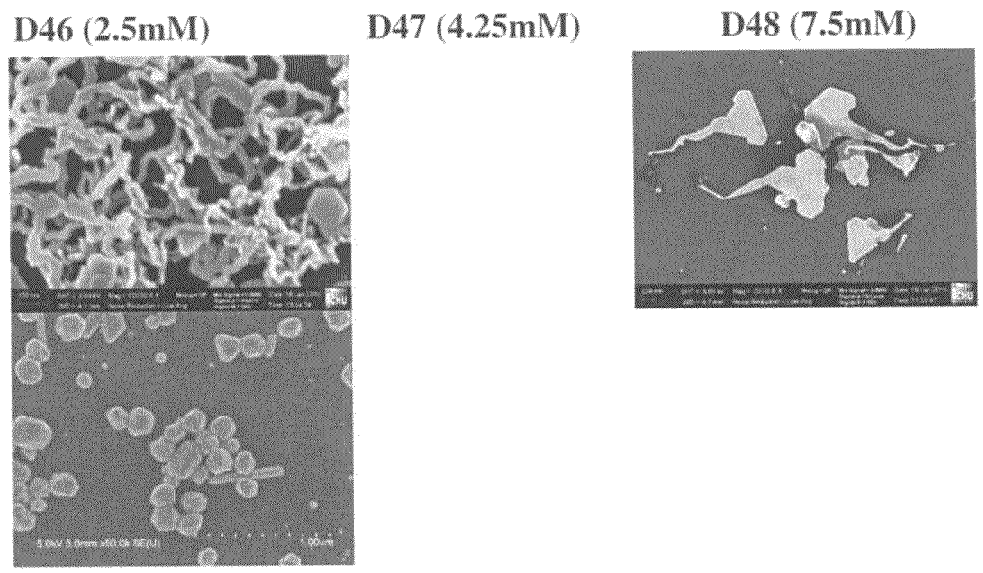
FIG. 8B shows the SEM images of exemplified dispersions D46, D47 and D48.

The SEM images of dispersions D46, D47, and D48 in FIG. 8B show that when the concentration of chloroauric acid is lower (2.5 mM), the obtained nanogold is mainly line-like, and as the concentration of chloroauric acid increases, the nanogold becomes skate-like, and when the concentration of chloroauric acid is increased to 7.5 mM, the nanogold is polyhedrol-like.

Example 6

Effects of Silver Nitrate Consumption

The nanosilver dispersions were prepared using the reacting components, amounts and conditions listed in Table 8 and according to the preparation process indicated above.

TABLE 8

| Nanosilver Dispersion | Metal Seed Crystal Aqueous Solution | Hyaluronic Acid Aqueous Solution (20 mL) | Silver Nitrate Aqueous Solution (10 mL) | Water Bath Heating Time (under 95° C.) |
|---|---|---|---|---|
| D49 | A1/0.96 mL | 0.5 wt % | 1 mM | 60 mins |
| D50 | A1/0.96 mL | 0.5 wt % | 5 mM | 60 mins |
| D51 | A1/0.96 mL | 0.5 wt % | 7.5 mM | 60 mins |
| D52 | A2/0.96 mL | 0.5 wt % | 1 mM | 60 mins |
| D53 | A2/0.96 mL | 0.5 wt % | 5 mM | 60 mins |
| D54 | A2/0.96 mL | 0.5 wt % | 7.5 mM | 60 mins |

Figure 9A:
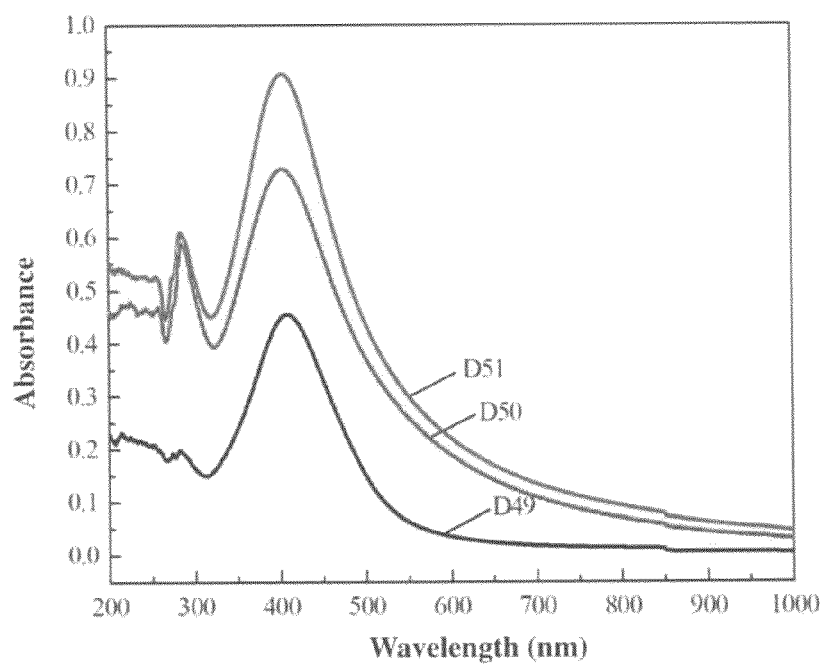
FIG. 9A shows the UV-vis-NIR absorption spectra of exemplified dispersions D49, D50 and D51.
Figure 9B:
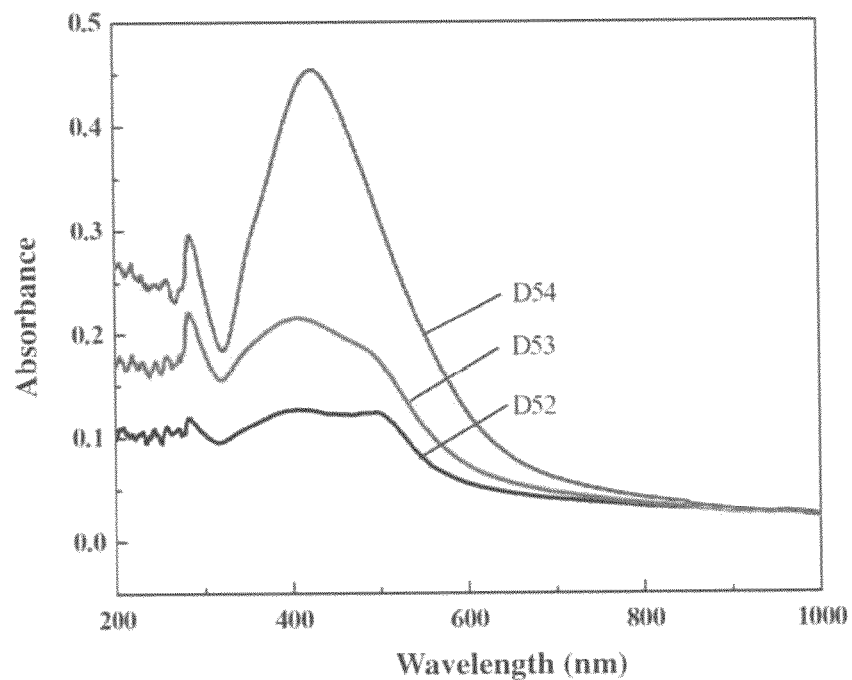
FIG. 9B shows the UV-vis-NIR absorption spectra of exemplified dispersions D52, D53, and D54.
Figure 10:
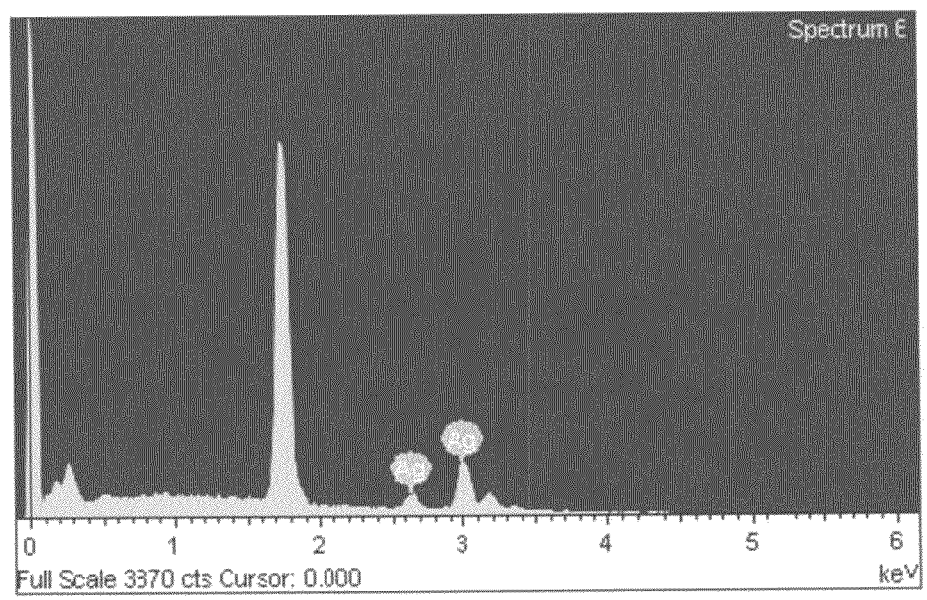
FIG. 10 shows the EDS spectrum of exemplified dispersion D54.

The UV-vis-NIR absorption spectra of dispersions D49, D50 and D51 are shown in FIG. 9A and the UV-vis-NIR absorption spectra of dispersions D52, D53 and D54 are shown in FIG. 9B, It can be found that when the concentration of silver nitrate increases, the yield of nanosilver also increases. FIG. 10 shows the EDS spectrum of dispersion D54.

Example 7

Exposure with UV light Radiation

The nanosilver dispersions were prepared using the reacting components, amounts and conditions listed in Table 9 and according to the preparation process indicated above.

TABLE 9

| Nanosilver Dispersion | Metal Seed Crystal Aqueous Solution | Hyaluronic Acid Aqueous Solution (20 mL) | Silver Nitrate Aqueous Solution (10 mL) | Radiation Time by UV light (Radiation Power: 1000 W) |
|---|---|---|---|---|
| D55 | A1/0.96 mL | 0.5 wt % | 1 mM | 1 min |
| D56 | A1/0.96 mL | 0.5 wt % | 5 mM | 1 min |
| D57 | A1/0.96 mL | 0.5 wt % | 7.5 mM | 1 min |
| D58 | A2/0.96 mL | 0.5 wt % | 1 mM | 1 min |
| D59 | A2/0.96 mL | 0.5 wt % | 5 mM | 1 min |
| D60 | A2/0.96 mL | 0.5 wt % | 7.5 mM | 1 min |

Figure 11A:
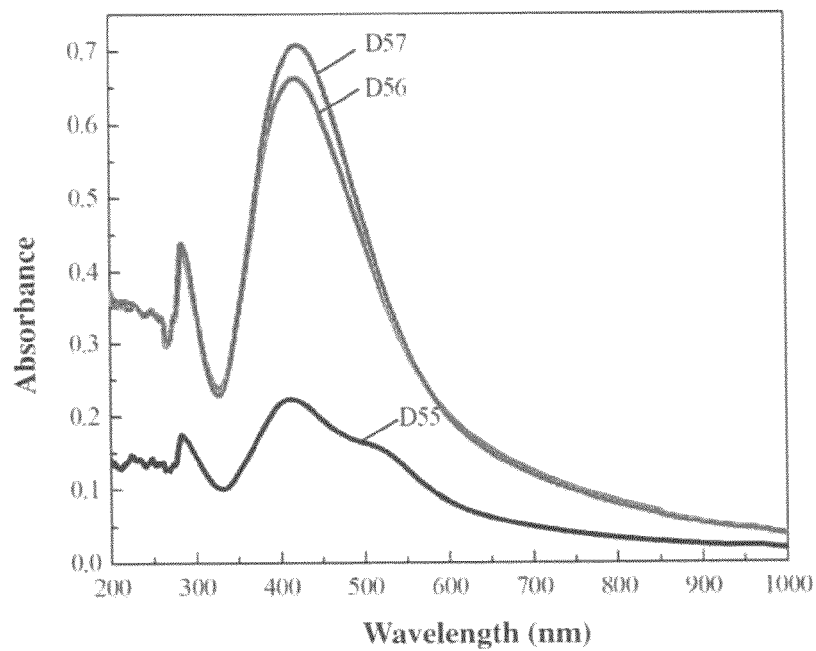
FIG. 11A shows the UV-vis-NIR absorption spectra of exemplified dispersions D55, D56 and D57.
Figure 11B:
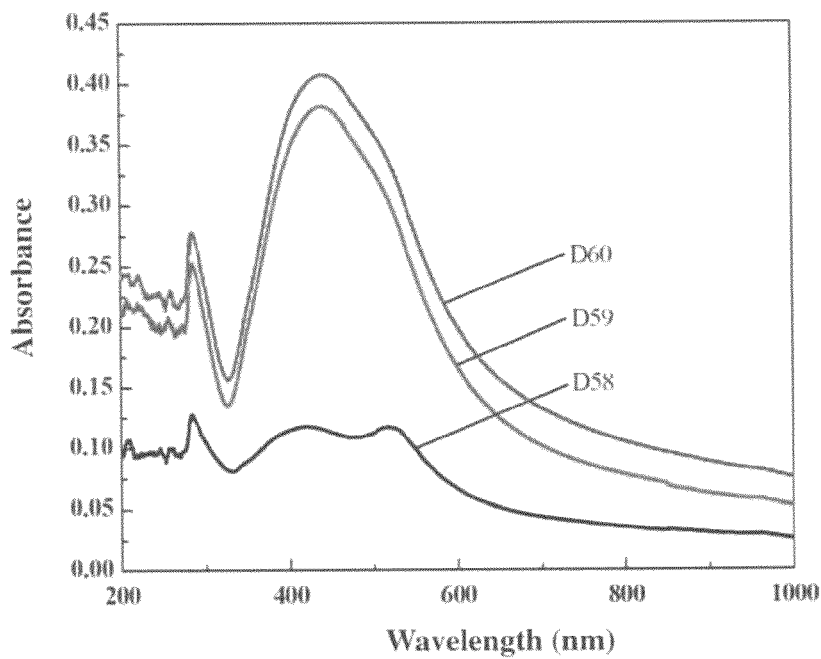
FIG. 11B shows the UV-vis-NIR absorption spectra of exemplified dispersions D58, D59 and D60.
Figure 12A:
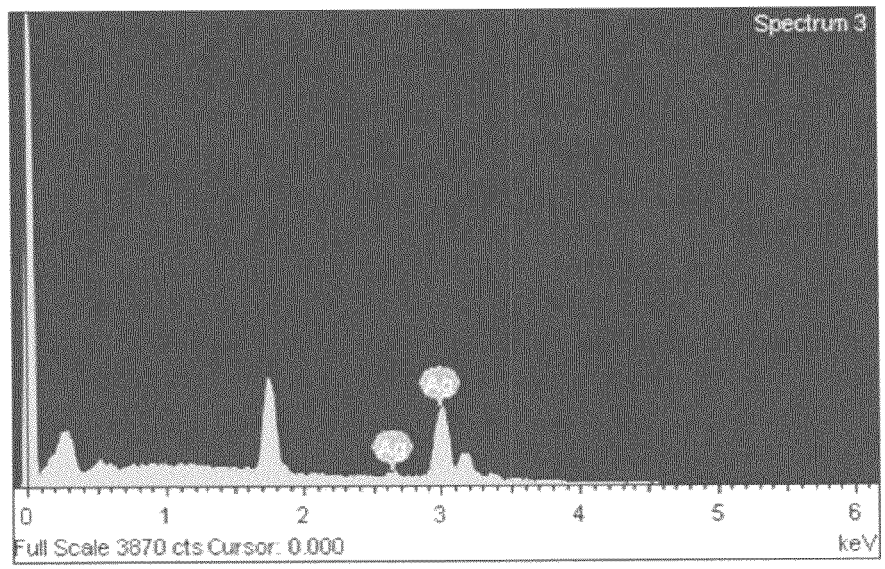
FIG. 12A shows the EDS spectrum of exemplified dispersion D57.
Figure 12B:
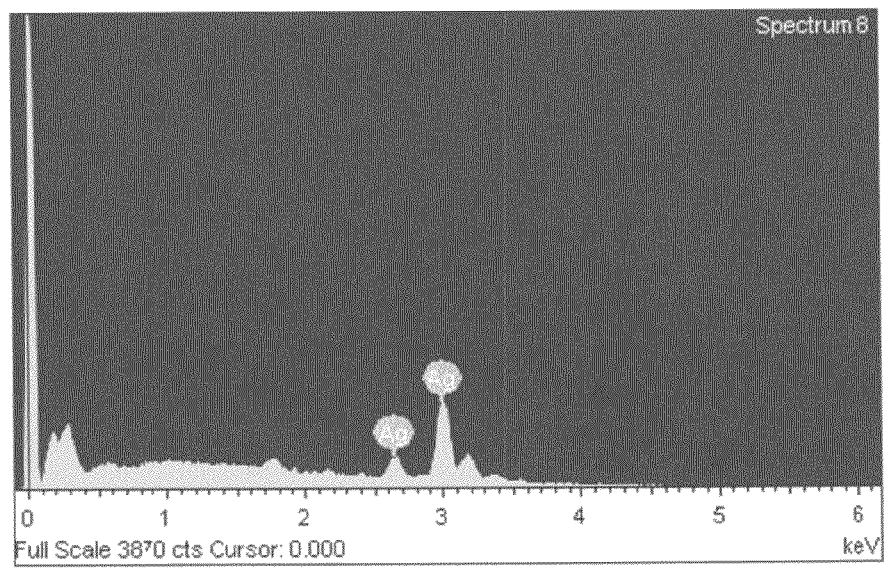
FIG. 12B shows the EDS spectrum of exemplified dispersion D60.

The UV-vis-NIR absorption spectra of dispersions D55, D55 and D57 are shown in FIG. 11A and the UV-vis-NIR absorption spectra of dispersions D58, D59 and D60 are shown in FIG. 11B. It can be found that when the concentration of silver nitrate increases, the yield of the nanosilver also increases. FIGS. 12A and 12B are the EDS spectra of dispersions D57 and D60.

According to the above examples, the present invention uses the polysaccharide hyaluronic acid, and thus, the reduction-oxidation reaction can be conducted through simple steps to provide a nanometal with the desired properties. The preparation process is safe and friendly to the environment. It can produce a high yield at low costs, and can further control the size and morphology of the nanometal.

The above examples are provided to illustrate the principle and efficacy of the present invention, but not to limit the scope of protection thereof. Peoples killed in this field may proceed with a variety of modifications and replacements based on the above disclosures without departing from the principle and spirit of the present invention. Therefore, the scope of protection of the present invention is substantially covered in the following claims as appended.

What is claimed is:

1. A method for preparing a nanometal dispersion which comprises:

mixing a metal seed crystal aqueous solution, a polysaccharide aqueous solution, and a metal compound aqueous solution to obtain a mixture wherein the polysaccharide aqueous solution comprises a polysaccharide composed of N-acetyl-D-glucosamine and glucuronic acid; and allowing the mixture to conduct reduction-oxidation reaction to form a nanometal therein.

2. The method as claimed in claim 1, wherein the metal seed crystal aqueous solution comprises a seed crystal of a metal selected from a group consisting of gold, silver and a combination thereof.

3. The method as claimed in claim 2, wherein the molar ratio of the metal seed crystal aqueous solution (calculated as the seed crystal) to the metal compound aqueous solution (calculated as the metal) is from about $2 \times 10^{-5}$ to about $1.81 \times 10^{-1}$.

4. The method as claimed in claim 1, wherein the polysaccharide is hyaluronic acid.

5. The method as claimed in claim 1, wherein the metal compound aqueous solution comprises a metal compound selected from a group consisting of chloroauric acid ($HAuCl_4$), silver nitrate ($AgNO_3$) and a combination thereof.

6. The method as claimed in claim 1, wherein the molar ratio of the polysaccharide aqueous solution (calculated as the polysaccharide) to the metal compound aqueous solution (calculated as the metal) is from about 556 to about 7,000,000.

7. The method as claimed in claim 1, wherein the step of mixing comprises mixing the metal seed crystal aqueous solution with the polysaccharides aqueous solution, followed by mixing with the metal compound aqueous solution.

8. The method as claimed in claim 1, wherein the step of allowing the mixture to conduct reduction-oxidation reaction comprises providing energy to the mixture with at least one of the following means: a water bath, an oil bath, a heating plate, a microwave reaction, an UV light radiation, and a γ-ray radiation.

9. The method as claimed in claim 1, wherein the step of allowing the mixture to conduct reduction-oxidation reaction comprises heating the mixture at about 40° C. to about 150° C. for about 0.5 minute to about 180 minutes.

10. The method as claimed in claim 9, wherein the heating is carried out at about 50° C. to about 95° C.

* * * * *